(12) United States Patent
Greiner et al.

(10) Patent No.: US 6,502,855 B1
(45) Date of Patent: Jan. 7, 2003

(54) CASING MODULE COMPRISING AN AIRBAG

(75) Inventors: Thomas Greiner, Bruckmühl (DE); Richard Mühlbacher, Grassau (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/868,794

(22) PCT Filed: Dec. 21, 1999

(86) PCT No.: PCT/EP99/10243

§ 371 (c)(1), (2), (4) Date: Jul. 25, 2001

(87) PCT Pub. No.: WO00/37286

PCT Pub. Date: Jun. 29, 2000

(30) Foreign Application Priority Data

Dec. 21, 1998 (DE) .................................... 298 22 768 U

(51) Int. Cl.⁷ .................... B60R 21/22; B60R 21/16; B60R 21/20
(52) U.S. Cl. .............. 280/730.2; 280/728.2; 280/728.3; 280/743.1
(58) Field of Search ............. 280/728.2, 728.3, 280/730.2, 743.1, 730.1

(56) References Cited

U.S. PATENT DOCUMENTS

| | | | |
|---|---|---|---|
| 5,605,346 A | | 2/1997 | Cheung et al. |
| 6,155,594 A | * | 12/2000 | Ibe et al. ................. 280/730.2 |
| 6,173,990 B1 | * | 1/2001 | Nakajima et al. ........ 280/730.2 |
| 6,234,515 B1 | * | 5/2001 | Iwanaga .................. 280/730.2 |
| 6,302,434 B2 | * | 10/2001 | Nakajima et al. ........ 280/730.2 |
| 6,333,515 B1 | * | 12/2001 | Kubota et al. ........... 280/743.1 |
| 6,334,626 B2 | * | 1/2002 | Nakajima et al. ........ 280/730.2 |
| 6,367,836 B1 | * | 4/2002 | Tanase et al. ........... 280/730.2 |
| 6,375,214 B1 | * | 4/2002 | Nishikaji ................. 280/730.2 |

FOREIGN PATENT DOCUMENTS

| | | |
|---|---|---|
| DE | 43 13 616 A1 | 10/1994 |
| DE | 196 22 231 A1 | 12/1997 |
| DE | 197 04 195 C1 | 10/1998 |
| EP | 0 812 739 A1 | 12/1997 |
| EP | 0 836 970 A1 | 4/1998 |
| EP | 0 872 390 A1 | 10/1998 |
| EP | 0 921 043 A1 | 6/1999 |

* cited by examiner

Primary Examiner—Kevin Hurley
Assistant Examiner—Matthew Luby
(74) Attorney, Agent, or Firm—Brooks & Kushman, P.C.

(57) ABSTRACT

The invention relates to a casing module (1), especially for a pillar (2) of a motor vehicle, comprising an accommodating space (3) for an airbag (4), a fastening device (5) for fastening the casing module to the pillar (2), and at least one pivotal section (6) which can swing outward and which forms at least one part of an outer wall (7) of the casing module (1) that is oriented toward the passenger compartment. The aim of the invention is to provided a casing module (1) which is easier to handle and construct and which, at the same time, ensures the deployment of the inflating airbag (4) in a reliable and controlled manner. To this end, the accommodating space (3) is arranged directly adjacent to the outer wall (7), and the pivotal section (6) forms at least one part of the accommodating space (3).

22 Claims, 4 Drawing Sheets

CASING MODULE COMPRISING AN AIRBAG

The present invention refers to a lining module in particular for a pillar of a motor vehicle with an accommodation space for an airbag, an fastening device for fastening at the pillar and at least one fold-away pivotal section, which forms at least part of an outer wall of the lining module directed towards the passenger compartment.

A lining module of this type is known from EP 0 795 445 A1. The lining module may be attached at any position within the motor vehicle, wherein it may also extent along an inside roof lining in the passenger compartment above the side doors. The accommodation space for the airbag is arranged within the lining module and directly adjacent to the corresponding pillar. The accommodation space is formed by a number of brackets that are spaced apart from one another relatively far, which comprise a storage portion and an attachment portion. The storage portion surrounds the airbag, and the fastening device is formed by two bracket arms, which can be locked together. At least one bracket arm at the same time forms part of the fastening device for the lining module. A pivotal section can be folded away which is supported at the end of the bracket arm in an embodiment of the known lining module, wherein the pivotal section at the same time forms the outer wall of the lining module.

The disadvantage of the known lining module is that the accommodation space for the airbag is formed separately in the lining module and that besides the fold-away-ability of the pivotal section, a predetermined breaking point must also be formed in the accommodation space for the exit of an inflating airbag. Furthermore, the attachment of the lining module at the pillar and the arrangement of the airbag in the accommodation space requires relatively much expenditure and work.

At this point, it must be noted that the accommodation space may serve for an inflatable part of the airbag and for further air bag components, such as rebound straps and tightening straps, an ignition mechanism, a gas generator etc.

A gas bag retaining system for passengers is known from DE 297 16 793 U1, in which a U-shaped accommodation container for a head gas bag is arranged along a roof frame. This head gas bag comprises at its lower end a flap pivotal via a hinge for exposing an interior space of the accommodation container. The inflating head gas bag may exit from this accommodation container. This known gas bag retaining system is formed separately to a corresponding lining of the roof frame or the like and must be handled separately from it and it must be attached at the roof frame.

Starting out from EP 0 795 445 A2, the subject matter of the application is based on the object of improving a lining module of the above-mentioned kind in that it is easier to handle and more easily structured and at the same time ensures the exit of the inflating airbag in a cafe and controlled manner.

This object is solved in connection with the features of the preamble of claim 1 in that the accommodation space is arranged directly adjacent to the outer wall and the pivotal section forms at least part of the accommodation space.

In this manner, no additional brackets are required that are formed and arranged separately in the lining module and that must be produced only by connecting corresponding bracket arms. Thus, a predetermined breaking point within the bracket is no longer necessary to let the inflating airbag exit. According to the invention, only the pivotal section is folded away, which forms part of the accommodation space itself, i.e. it forms part of its edge. This leads to a lining module easy to manufacture, wherein at the same time the arrangement of the airbag in the accommodation space is facilitated. Since only part of the lining module is folded away or opens, the opening behavior of the lining module can be easily adjusted and can therefore be controlled in a safer and better way. Instead of an additional predetermined breaking point, as in the known lining module, the exit of the airbag from the lining module is only influenced through the adjustment of the opening force of the pivotal section.

The pivotal section may for instance almost completely line the accommodation space. In order to form the pivotal section in a more simple way, this section can also be only one wall of the accommodation space facing the passenger compartment.

In this connection it is conceivable that the pivotal section extends substantially in the longitudinal direction of the lining module and is connected to the remaining outer wall via a substantially linear pivot connection. Along this pivot connection, the pivotial section can be folded down outwards in the direction towards the passenger compartment when the airbag exists.

Such a pivot connection can be formed in various manners. It may for instance at least partially be formed by a material weakening. Such a material weakening may result from a small wall thickness of the outer wall. Furthermore, the material weakening may be formed by a film hinge, a groove etc. It is also conceivable that the pivot connection is formed by a material different to the material of the remaining outer wall, wherein this other mater al is preferably relatively soft. The various manners of material weakening may also be used in combination, such as a film hinge or a groove of a softer material. Different material weakening may also be arranged along the pivot connection so that for instance a section of the pivot connection is formed by a softer material component and a further section is formed by a film hinge. Such a combination of material weakening can prove to be advantageous when the lining module has curvatures and the material weakening preferred for this portion is formed in the area of such a curvature.

A simple pivtotal section with a simple structure can be realized in that it is an edge portion of the outer wall.

In order to prevent accidental folding-away of the pivotal section without the affect of the airbag, the pivotal section may be detachably attached with its free end at a part of the motor vehicle.

Since sealing elements are arranged in the area of the pillars, in particular on the side of corresponding vehicular panes, the free end of the pivotal section may for instance be lockable with a sealing element extending along the pillar.

In order to easily structure the accommodation space for the airbag, a cover means covering the airbag opposite of the pivotal section may be arranged at least on parts of an inner side of the outer wall, This cover means may also extend continually in the longitudinal direction along the entire airbag.

In the case of curved lining modules, in particular when the curvature is somewhat stronger, it is advantageous when the cover means is arranged segment-wise in the longitudinal direction of the lining module. The gap between the individual segments may be as small as possible to protect the airbag.

In order to arrange the airbag in the lining module and in particular in the accommodation space, it can for instance be inserted into the accommodation space by folding away the pivotal section. In order not to unnecessarily operate the pivot connection between the pivotal section and the remaining outer wall, and to prevent a possible change of its characteristics, the cover means may be formed by an at least partially pivotal cover relative to the outer wall.

A simple embodiment for such a cover comprises a cover wall connected with the inner side of the cutter wall via a pivot connection. The accommodation space may for instance be formed by this cover wall and the pivotal section.

As is already the case in the pivot connection of the pivotal section, the pivot connection of the cover wall may also be formed by a material weakening, such as a groove, a film hinge, a softer material component etc. Combinations of such material weakenings are also conceivable.

In order to simply close the cover after inserting the airbag into the accommodation space, the cover may detachably be fastened with its free end at an inner side of the pivotal section.

In order to easily design the detachable attachment, the free end of the cover and the inner side of the pivotal section may be detachably locked together.

In order to prevent injury of the passengers e.g. by an impact against the lining module in particular in the area of the pivotal section, at least one energy-absorbing element may be arranged on the outer side and/or inner side of at least the pivotal section.

As a simple embodiment for such an element, at least a rib extending substantially obliquely to the longitudinal direction of the lining module is conceivable. This rib may be formed integrally with the pivotal section or it may be attached thereon later. A further example for such an impact-energy-absorbing element is a damping material such as foam etc., which is attached at the pivotal section.

The attachment of the lining module may be made in a manner known per se, wherein a corresponding fastening device can be formed by clip connections and/or screw connections and/or plug connections.

In order to be able to manufacture corresponding plug connection integrally with the lining module, such a plug connection may be formed by a plug pin projecting from the inner side of the outer wall, said plug pin being frictionally insertable into a corresponding plug-in bore in a pillar.

Except for its arrangement in the accommodation space, the airbag may at least be attached at some further positions at the lining module and/or at the pillar, wherein the additional attachment may be implemented by clip connections and/or screw connections and/or plug connections.

In an embodiment the airbag is for instance directly or indirectly attached at the plug pin.

To enforce the plug pins and in particular to also avoid a damage of the plug pin when being plugged into the plug-in bore, a metal sleeve may be arranged on a free end of the plug pin.

In order to avoid generation of noise during the relative movement of the plug pin and the plug-bore, a bushing preferably made of plastics may be arranged between both.

The outer vial of the lining module, the cover and also parts of the fastening device are preferably formed in one piece, wherein material for the lining module may for instance be different plastics, fleece soaked with resin etc. also in combination, which can be laminated with a cover material on their outer side or visible upper surface.

Advantageous embodiments of the invention will now be described in detail by means of the Figures enclosed in the drawing.

FIG. 1 shows in a basic view a lining module 1 for in particular an A-pillar 2, wherein only some sections of the pillar are shown for reasons of simplification.

The lining module 1 serves as a pillar lining and comprises an outer wall 7 pointing towards the passenger compartment of a motor vehicle. An accommodation space 3 for an airbag 4 is formed within an in one piece with the lining module 1. Such an airbag comprises an inflatable gas bag and corresponding means, such as a gas generator, ignitor etc.

Figure 1:
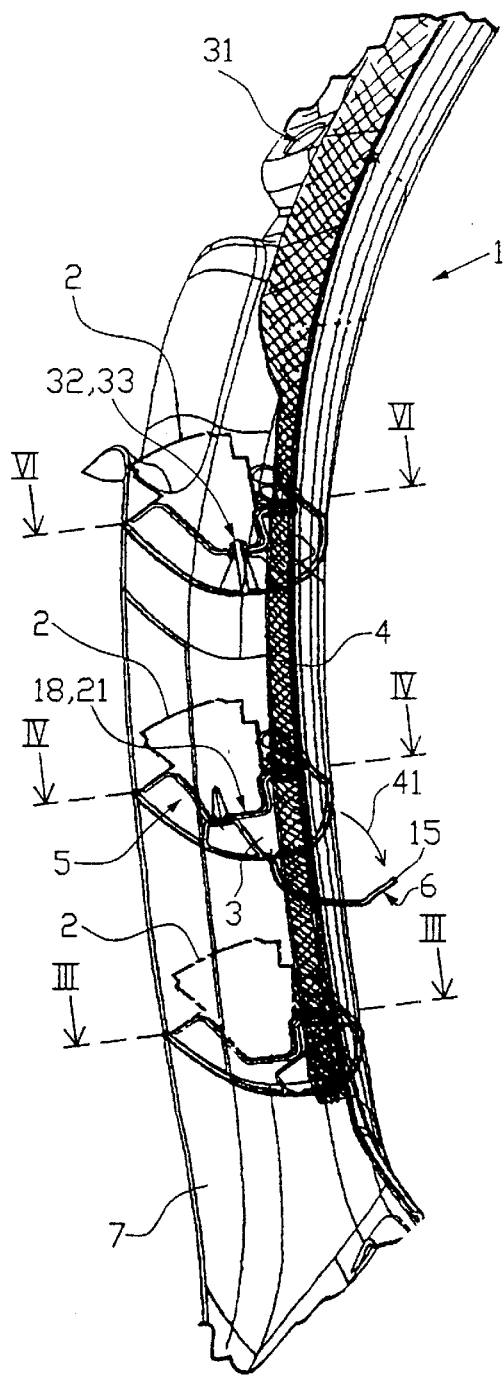
FIG. 1 shows a lining module according to the invention with an airbag in a out view.
Figure 2:
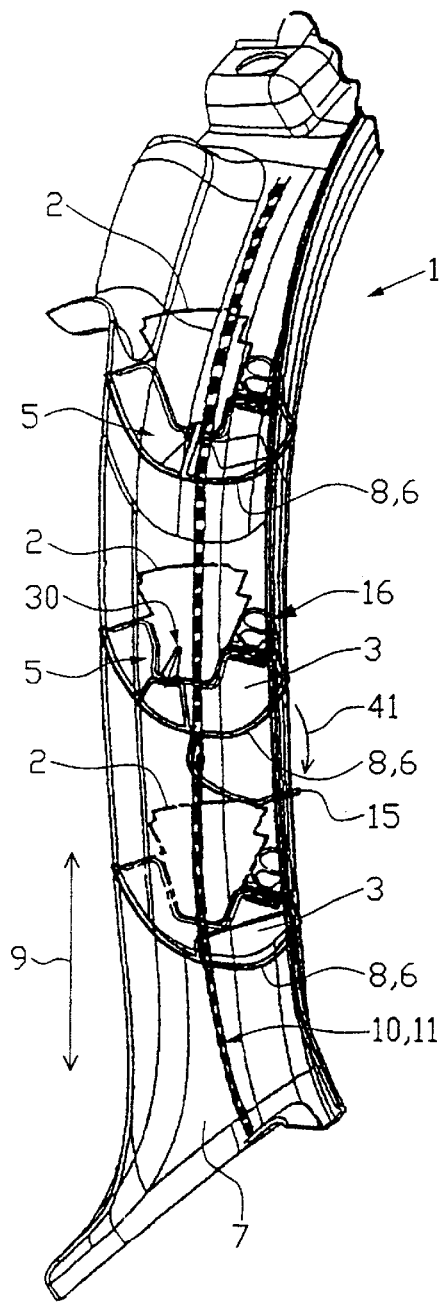
FIG. 2 is a view of a lining module as in FIG. 1 without the airbag.

In FIGS. 1 and 2, the accommodation space is shown in some sections only according to the section 3 of the A-pillar 2, which will be explained in detail by means of the further Figures. The accommodation space 3 extends in the longitudinal direction 9, see FIG. 2, of the lining module 1 and forms a shot and protective channel for the airbag 4.

An fastening device 5 for attaching the lining module at the respective pillair is arranged within the lining module 1. The attachment device 5, see also FIG. 2, is formed by clip connections 30 and/or plug connections 32 and/or screw connections.

A part of the outer wall 7 of the lining module 1 is formed as a pivotal section 6 which is pivotal along a pivotal connection 10, see FIG. 10 in the pivot direction 41 with respect to the remaining outer wall 7 in the direction towards the passenger compartment The pivot connection 10 is formed by a material weakening 11, which extends in the longitudinal direction 9 of the lining module 1 between the pivotal section 6 and the remaining outer wall 7.

According to the invention, the pivotal section 6 forms part of the accommodation space 3 for the airbag 4 and in particular a wall 8 of the accommodation space pointing towards the passenger compartment. The wall 8 and the pivotal section 6 comprises a free end 15 which is detachably attached at a sealing element 16 along the pillar 2. Opposite to the wall 8, the accommodations space is limited by a cover 19 or by a cover wall 21 as a cover means 18.

While the pivotal section 6 extends along the entire longitudinal direction 9 of the lining module 1 as part of its outer wall 7, the cover 19 may be divided into segments. As will be explained later, the cover 19 is also pivotally supported at the lining module 1. Due to the length of the pillar and its curvature and the corresponding curvature of the lining module 1, such a division into segment is therefore advantageous for pivoting the cover. A gap between the individual segments is so small as possible to obtain a substantially closed accommodation space 3 for protecting the airbag.

Figure 3:
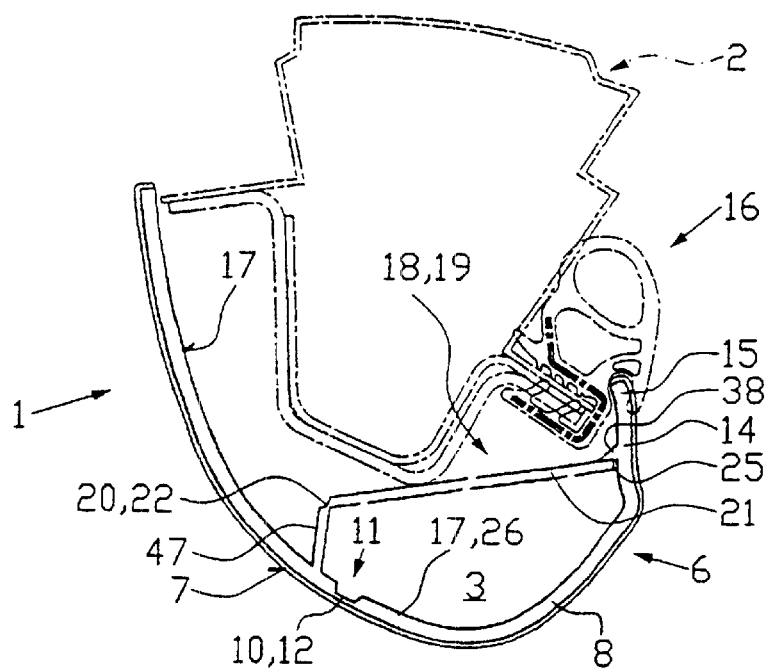
FIG. 3 shows a section along the line III—III of FIG. 1.

FIG. 3 shoes a section along the line III—III of FIG. 1. For reasons of simplification the airbag 4 is not shown in this Figure and also not in FIGS. 4, 5, 7 and 8.

The pivot connection 10 between the pivotal section 6 and the remaining outer wall 7 is formed in the embodiment according to FIG. 3 by a material weakening 11 in the form of a groove 12. The pivotal section 6 extends from this groove 12 up to its free end 15, which is detachably attached at the sealing element 16, see also FIGS. 1 and 2. The sealing element 16 is plugged in a manner known per se to the pillar 2 and has an insertion opening extending in the longitudinal direction 9 of the lining module into which the free end 15 of the pivotal section 6 is inserted.

On the inner side 17 of the outer wall 7, the cover means 18 projects as a cover 19 and is formed by the cover wall 21 and a foot section 47. Between the cover wall and the foot section, a pivot connection 20 in the form of a material weakening 22 is arranged. Through this material weakening 22, the cover wall 21 is pivotally supported relative to the inner side and with its free end 25 it is detachably connected to the pivotal section 6 on the inner side 26 thereof. The detachable attachment is implemented via a lock nose 38 inwardly projecting into an edge portion 14 of the outer wall 7, said lock nose gripping behind the cover wall 21 with its free end in its closing position.

The accommodation space for the airbag is formed by the cover 19 and the pivotal section 6, wherein the pivotal section 6 forms a wall of the accommodation space pointing towards the passenger compartment.

Figure 4:
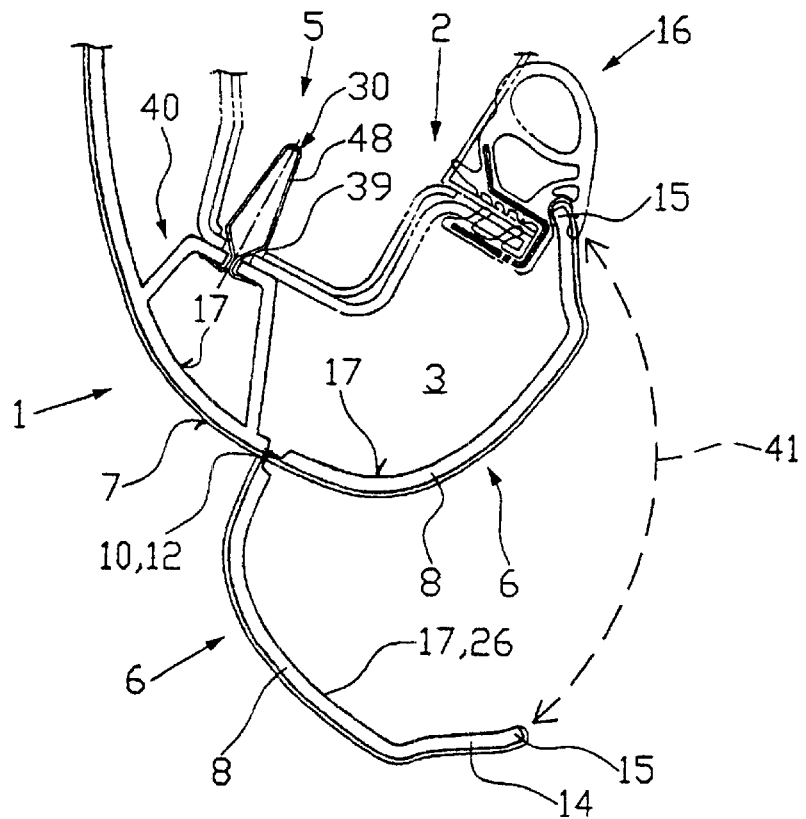
FIG. 4 shows a section along the line IV—IV of FIG. 1.

FIG. 4 shows a section along line IV—IV of FIG. 1. This section exactly lies in a clip connection 30 as part of the attachment device 5 for the lining module 1 at the pillar, see also FIGS. 1 and 2. Equal parts are provided with equal reference numerals as in the following Figures, and will be mentioned partially only.

Such a clip connection 30 for a lining module 1 is known per so, wherein the clip connection comprises a clip held in a clip support 40 and a clip opening 39 in the pillar 2. The clip support 40 is formed integrally with the lining module 1 and projects from the inner side 17 of the outer wall 7 in the direction towards the pillar 2.

FIG. 4 shoves the pivotal section 6 in its closing and opening position. In the closing position, the pivotal section 6 is detachably attached with its free end 15 at the sealing element 16, and in the open position, the free end 15 is pivoted in the pivotal direction 41, whereby the accommodation space 3 is open for the exit of the inflatable airbag. The pivoting of the pivotal section 16 in the pivotal direction 41 is implemented via The pivot connection 10, which was already described above. In the open position, an inner side 26 of the pivotal section 6 substantially points in the direction towards the passenger compartment that is not shown.

Figure 5:
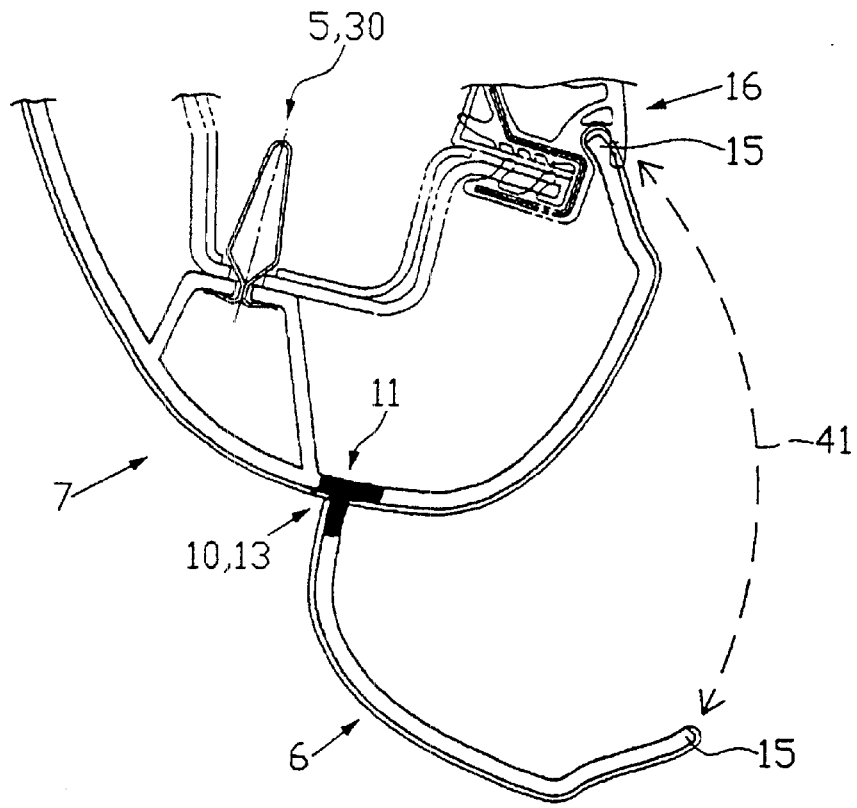
FIG. 5 is a view of a further embodiment corresponding to FIG. 4.

FIG. 5 corresponds to a section according to FIG. 4, wherein a second embodiment is shown for the pivot connection 10 between the pivotal section 6 and the remaining outer wall 7. In this case, the pivotal connection 10 is formed by a material component 13 as material weakening 11 that is softer compared to the remaining material of the outer wall 7. Analogously to FIG. 4, the pivotal section 6 is shown in its closed and open position.

Figure 6:
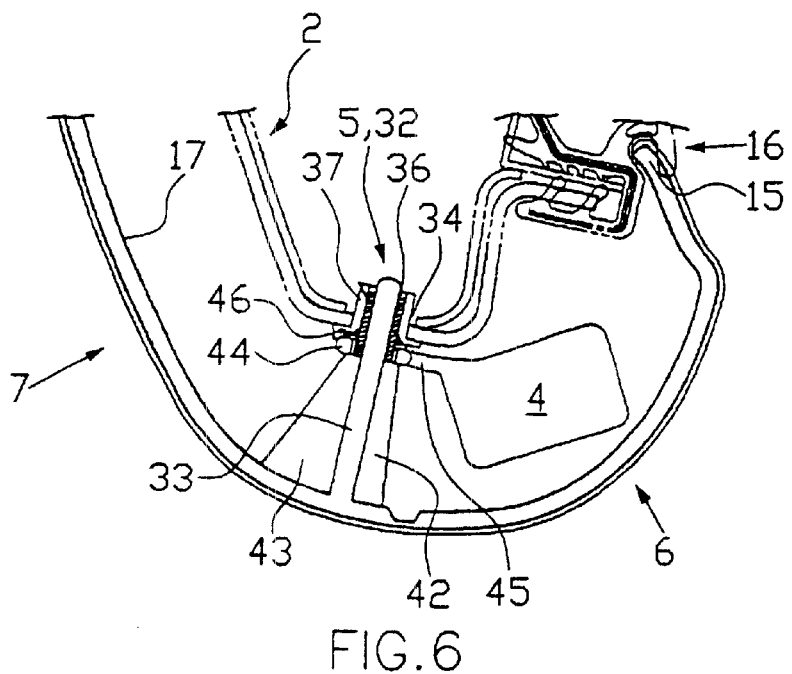
FIG. 6 is a sanction along the line VI—VI of FIG. 1.

FIG. 6 shows a section along the line VI—VI of FIG. 1.

In this case, the section is made through a plug connection 32 as part of the fastening device 5. The plug connection 32 is formed by a plug pin 33 and a corresponding insertion bore 34 in the pillar 2. The plug pin 33 projects from the inner side 17 of the outer wall 7 and may have laterally arranged ribs 42 and 43 which also project from the inner side 17. A free end of the plug pin 33 is inserted into the plug-in bore 34 and on this free end, a metal sleeve 36 and/or a plastic bushing 37 is plugged onto this free end in an embodiment. The metal sleeve 36 extends up to the ends of the ribs 42 and 43 and the bushing 37 ends at a spacing to the ribs. A holding lug 34 is arranged on the plug pin 33 and the metal sleeve between the bushing 37 and the ends of the ribs 42 and 43, said holding lug being connected to the airbag 4 via a bracket 45. The holding lug 44 serves for supporting the airbag.

The holding lug 44 may be fixed in its position on the plug pin 23 by means of a safety element.

In the sections according to FIGS. 5 and 6 it must be noted that the sections are made in a manner that exactly at these positions the gaps between the segments of the cover means 18 exist so that the cover means 18 cannot be seen in these Figures.

Figure 7:
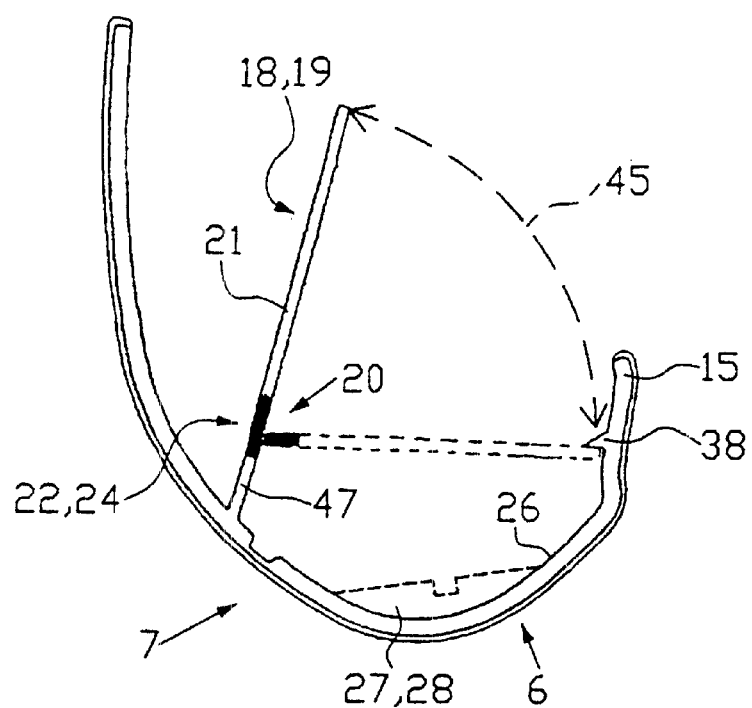
FIG. 7 is a view according to FIG. 3 for a further embodiment of the invention without the pillar.

FIG. 7 shows a further embodiment according to the invention corresponding to the section according to FIG. 3. In this further embodiment, the pivot connection 20 between the cover wall 21 and the foot section 47 is formed by a softer material component 24 as material weakening 22. The cover wall 21 is shown (in dotted line) in its open position and in its closed position.

Furthermore, a rib 28 as an energy-absorbing element 27 is shown in FIG. 7 on the inner side 26 of the pivotal section 6.

Figure 8:
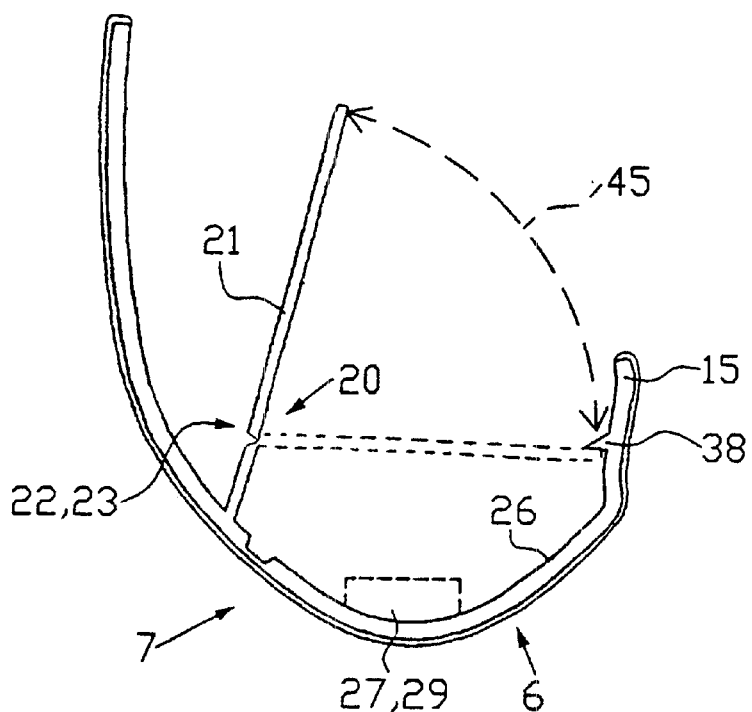
FIG. 8 is a view as in FIG. 7 for a further embodiment according to the invention.

In FIG. 8 in another embodiment according to the invention, a damping material as an energy-absoarbing element 27 on the inner side 26 of the pivotal section 6 is shown. Furthermore, the material weakening in the embodiment according to FIG. 8 is formed for the pivot connection by a groove or a film hinge 23. The cover wall 21 is again shown in its open position (in dotted lines) and in its closed position.

The assembly and installation of the lining module according to the invention and its function will now briefly be explained by means of the Figures.

The cover 19 for the airbag 4 is manufactured as part of the lining module 1. The airbag is inserted into the accommodation space 3 and possibly, see FIG. 6, attached at some positions at the lining module 1. Subsequently, the cover 19 is pivoted into its closing position and is fixed by locking with the locking nose 38. The pivoting is enabdled or facilitated by the pivot connection 20, which is formed by a material weakening in the form of a softer material component, a film hinge, a groove, etc.

The cover 19 may be divided into segments due to the length of the pillar 2 and its curvature in order to enable pivoting of the cover segments. A gap between she individual segments is as small as possible to safely protect the airbag in its accommodation space.

The lining module with the airbag 4 inserted is subsequently to be attached at the pillar 2 by the fastening device 5, wherein the fastening device is formed by clip connections, screw connections or plug connections, wherein another combination of these connections is also possible.

When activating the airbag, the lining module 1 opens by pivoting the pivotal section 6 along the pivot connection 10. This connection is also formed as a material weakening for instance in the form of a softer material component, a second material component, a groove, a film hinge etc. It is also possible to combine a plurality of these material weakenings with one another.

The lining module 1 is held by the fastening device at the pillar 2 and when the airbag unfolds, the pivotal section 6 unfolds along the pivot connection 10 so that the airbag may exit from the lining module 1 or the accommodation space 3 in the direction towards the passenger compartment.

In this case the airbag may be held at the lining module 1 according to FIG. 6 or also through the screw connection 31 of the lining module 1.

If necessary the lining module may have on the inner side of the outer wall 7 ribs, damping material or other energy-absorbing elements.

What is claimed is:

1. A lining module for a pillar of a motor vehicle, comprising an accommodation space for an airbag, a fastening device for fastening the lining module at the pillar and at least a fold-away pivotal section, which forms at least part of an outer wall of the lining module pointing towards the passenger compartment, wherein the accommodation space is arranged directly adjacent to the outer wall and the pivotal section forms at least part of the accommodation space, wherein a cover means covering the airbag opposite to the pivotal section is arranged at least partially on an inner side of the outer wall, said cover means being formed by a cover at least partially pivotal relative to the outer wall.

2. A lining module as claimed in claim 1, wherein the pivotal section forms a wall of the accommodation sapce facing the passenger compartment.

3. A lining module as claimed in claim 1, wherein the pivotal section extends substantially in the longitudinal direction of the lining module and is connected to the remaining outer wall via a substantially linear pivot connection.

4. A lining module as claimed in claim 3, wherein the pivot connection is at least partially formed by a material weakening.

5. A lining module as claimed in claim 3, wherein the pivot connection is at least partially formed by a film hinge.

6. A lining module as claimed in claim 3, wherein the pivot connection is formed at least partially by a material component that is softer relative to the material of the remaining outer wall.

7. A lining module as claimed in claim 1, wherein the pivotal section is an edge portion of the outer wall.

8. A lining module as claimed in claim 1, wherein the pivotal section is detachably connected with its free end at a portion of the motor vehicle.

9. A lining module as claimed in claim 8, wherein the free end of the pivotal section can be locked with sealing elements extending along the pillar.

10. A lining module as claimed in claim 1, wherein the cover means is arranged segment-wise in the longitudinal direction of the lining module.

11. A lining module as claimed in claim 1, wherein the cover comprises a cover wall connected to the inner side of the outer wall via a pivot connection.

12. A lining module as claimed in claim 11, wherein the pivot connection is formed by a material weakening.

13. A lining module as claimed in claim 12 wherein the material weakening is formed by a groove, a film hinge, or a softer material component.

14. A lining module as claimed in claim 1, wherein the cover is detachably attached with a free end at an inner side of the pivotal section.

15. A lining module as claimed in claim 14, wherein the free end of the cover and the inner side of the pivotal section are detachably locked together.

16. A lining module as claimed in claim 14, wherein on one side of at least the pivotal section at least one energy-absorbing element is arranged.

17. A lining module as claimed in claim 16, wherein the energy-absorbing element is formed as a rib extending substantially obliquely to the longitudinal direction of the lining module.

18. A lining module as claimed in claim 16, wherein the energy-absorbing element is formed of a damping material such as foam.

19. A lining module as claimed in claim 1, wherein fastening device is selection from a clip connection, a screw connection and a plug connection.

20. A lining module as claimed in claim 19, wherein said fastening device comprises the plug connection which is formed by at least one plug pin projecting from the inner side of the outer wall, said plug pin being frictionally insertable into a corresponding plug-in bore in the pillar.

21. A lining module as claimed in claim 20, wherein a metal sleeve is arranged at the free end of the plug pin.

22. A lining module as claimed in claim 20, wherein a bushing, preferably of plastic material, is arranged between the plug pin and the plug-in bore.

* * * * *

UNITED STATES PATENT AND TRADEMARK OFFICE
CERTIFICATE OF CORRECTION

PATENT NO.    : 6,502,855 B1
DATED         : January 7, 2003
INVENTOR(S)   : Thomas Greiner et al.

It is certified that error appears in the above-identified patent and that said Letters Patent is hereby corrected as shown below:

<u>Column 7,</u>
Line 16, delete "sapce" and insert -- space -- therefor.

Signed and Sealed this

Twenty-fifth Day of March, 2003

JAMES E. ROGAN
*Director of the United States Patent and Trademark Office*